May 19, 1964 C. SCHRAMM 3,133,358
TEACHING AID
Filed Oct. 1, 1962 2 Sheets-Sheet 1

Chris Schramm
INVENTOR.

BY

May 19, 1964 C. SCHRAMM 3,133,358
TEACHING AID

Filed Oct. 1, 1962 2 Sheets-Sheet 2

INVENTOR
Chris Schramm
BY
Edward Everly Bishop
ATTORNEY

United States Patent Office 3,133,358
Patented May 19, 1964

3,133,358
TEACHING AID
Chris Schramm, 7420 81st St., Edmonton, Alberta, Canada
Filed Oct. 1, 1962, Ser. No. 227,127
3 Claims. (Cl. 35—31)

In general this device relates to a manually operable aid for teaching mathematics.

The principal object is to provide a device into which various articles may be inserted and that includes means to indicate the number of articles inserted and the sum or difference of a group of articles.

An additional object is to provide a device that will demonstrate visibly the fact that the relative position, size, order or substance of various objects has no effect on the somewhat difference of such object.

A still further object is to provide a teaching aid wherein the integers revealed by the machine always will be related to the number of objects placed in the machine and wherein the integers revealed by the machine always will change in accordance with the number of objects placed in or taken from the machine.

A still further object is to provide a device wherein the sum or difference of objects placed in the machine always will be revealed by the machine and will change as objects are installed or removed from the machine.

An additional object is to provide a device wherein the objects to actuate the machine may be simple pegs that may be grasped and handled with facility by persons of limited intellect or by persons suffering some physical impairment.

In the drawings illustrating the preferred embodiment of my device.

Figures 1, 2:
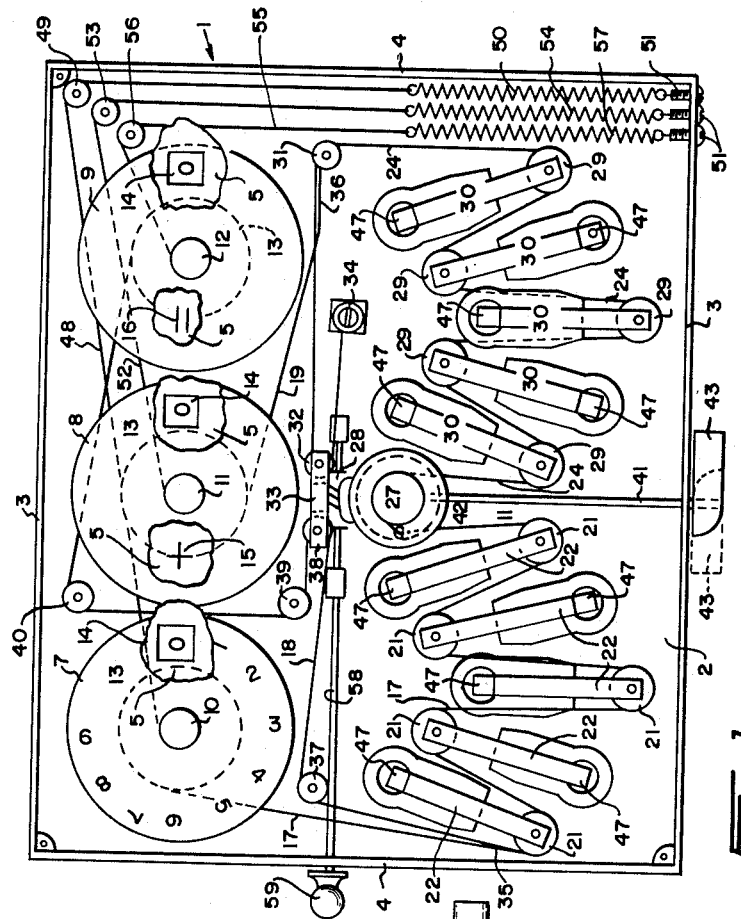
FIG. 1 is a plan view with the cover broken away to illustrate the internal mechanism of the device.
FIG. 2 is a sectional end elevation of my device.

With reference now to the drawings my device consists of a housing indicated generally at 1 and which preferably may be in rectangular form and of molded construction with an integral bottom 2, sides 3—3 and ends 4—4. A cover 5 may be secured removably to the housing 1 through attaching screws 6 or like means.

Indicating wheels, which in this case are three in number, are indicated as 7, 8 and 9 and preferably are each in the form of a drum with an enlarged centre portion 13. An axle 10 projects from the drum 7, an axle 11 projects from the drum 8 and an axle 12 projects from the drum 9.

The wheels 7, 8 and 9 each have mathematical integers inscribed on the faces thereof and windows 14 in the cover 5 are positioned so that the mathematical integers on the wheels 7, 8 and 9 may be seen through the windows as the wheels are rotated.

Mathematical symbols, in this case the plus sign 15 and the equal sign 16, are inscribed on the cover 5 and positioned so that the sum of the integers of the wheels 7 and 8 will be indicated by the integers of the wheel 9.

Rotation of the wheels 7 and 9 is accomplished through the cables 17 and 18 respectively. The cable 17 is connected at its one end to the drum 13 of the wheel 7 and is wound on the drum 13, while the cable 18 is connected to the drum 13 of the wheel 9 and is wound on that drum. The cable 17 is passed over the idler pulleys 21 of the group of slides 22 which, in this case, are five in number, and at its opposite end the cable 17 is wound around the drum 27 at the centre of the machine. From the drum 27 the cable is passed around the adjustment spindle 28 back to the drum 27 and continues from the drum 27 as cable 24, which is passed around the idler pulleys 29 of the group of slides 30. These slides are identical to the slides 22 and like the slides 22 are five in number. From the idler pulleys 29 the cable 24 is passed around the idler 31 to the idler wheel 32 in travelling block 33 and the cable 24 is then terminated securely at the termination 34 within the housing.

The cable 18 is connected at its one end at 35 to the cable 17 and is routed over the idler pulley 37 to the idler pulley 38 in the travelling block 33 and then over idler pulleys 39 and 40 to the drum 13 of the wheel 9.

With this construction, it will be obvious that simultaneous movement of the cables 17 and 18 will rotate the wheels 7 and 9 in an anti-clockwise direction.

The wheel 8 is rotated by the cable 19 which is connected at its one end at 36 to the cable 24 and at its opposite end to the drum 13 of the wheel 8. Simultaneous movement of the cables 19 and 24 therefore, will rotate the wheel 8 and, through the travelling block 33 will also pull on the cable 18 to rotate the wheel 9 in an anti-clockwise direction.

The centre drum 27 normally is held immovable by the rod 41 which extends into an opening 42 in the drum and which may be manually released by manipulation of the cam 43 pivoted on the rod 41 and reacting against the side of the housing to withdraw the rod. With the rod 41 inserted in the drum and the drum held immovable, the cables 17 and 24 will, in effect, be terminated at the drum 27 and any tightening or slackening of the cables 17 and 24 will be transmitted to the wheels 7, 8 and 9.

As constructed and with the drum 27 immovable, the device is limited to the study of numbers up to and including all combinations of numbers to 5 plus 5.

The drum 27 may be moved by rotation of the spindle 28 which is connected to the shaft 58 and actuating knob 59. When the rod 41 is withdrawn from the drum 27 rotation of the actuating knob 59 will rotate the spindle 28 and rotate the drum 27 in either the clockwise or anti-clockwise direction to rotate the wheels 7, 8 and 9 and so that combinations of numbers up to and including 10 plus 0 and 0 plus 10 may be studied. It is important, however, to note that the actuating knob 59 must always be rotated to return the wheels so that the number 0 is visible in the windows when addition by the insertion of pegs in the groups is to be done.

While I do not consider that the wheels will be rotated by the knob 59 in other than special cases, I have found that as students progress beyond the simple calculations up to 5 plus 5, the ability to be able to rotate the wheels so that the student will be able to see that as one component part increases by a certain amount the other part will decrease by the same amount and the student will therefore be forced to associated and deduct numbers in his thinking.

Movement of the cable 17 over the pulleys 21 or 29 is accomplished by inserting a peg 44 in one of the openings 45 in the lid 5 in the housing, which will bring the beveled end 46 of the peg into contact with the bevelled surface 47 of a slide 22 or 30, as the case may be, and the slide will then be moved as indicated by the dotted lines in FIG. 2 in the drawings.

Movement of a slide 22 or 30 will move the idler 21 or 29 as indicated and this will draw on the cables 17 or 24 to move the wheels 7, 8 and 9 as previously described.

Normally the wheels 7, 8 and 9 are held in an extreme clockwise position with the integer 0 revealed by the windows 14. Rotation of the wheels 7, 8 and 9 in the clockwise direction and maintenance of the wheels in the extreme clockwise position is accomplished through the cables wound at one end around the axles of the wheel and routed to adjustable tension springs at their opposite ends. As seen in the drawings, a cable 48 routed over the idler 49 to the springs 50 controls the wheel 7. A similar cable 52 routed over an idler 53 to a spring 54 controls wheel 8 and a cable 55 routed over an idler 56 to a spring 57 controls wheel 9. All of the springs 50, 54 and 57 are connected to adjusting screws 51.

In operation, with no pegs inserted and with the rod 41 inserted in the opening 42 to lock the drum 27, the integers 0 of each of the wheels 7, 8 and 9 would appear in the openings 14.

If a peg 44 is then inserted to move one of the slides 22, the cable 17 will be tightened to move the drum 7 and reveal the integer 1 through the opening 14 associated with the drum 7 and, at the same time, the cable 18 will be tightened to rotate the wheel 9 in an anti-clockwise direction and reveal the integer 1 through the opening 14 associated with that wheel.

Figure 3:
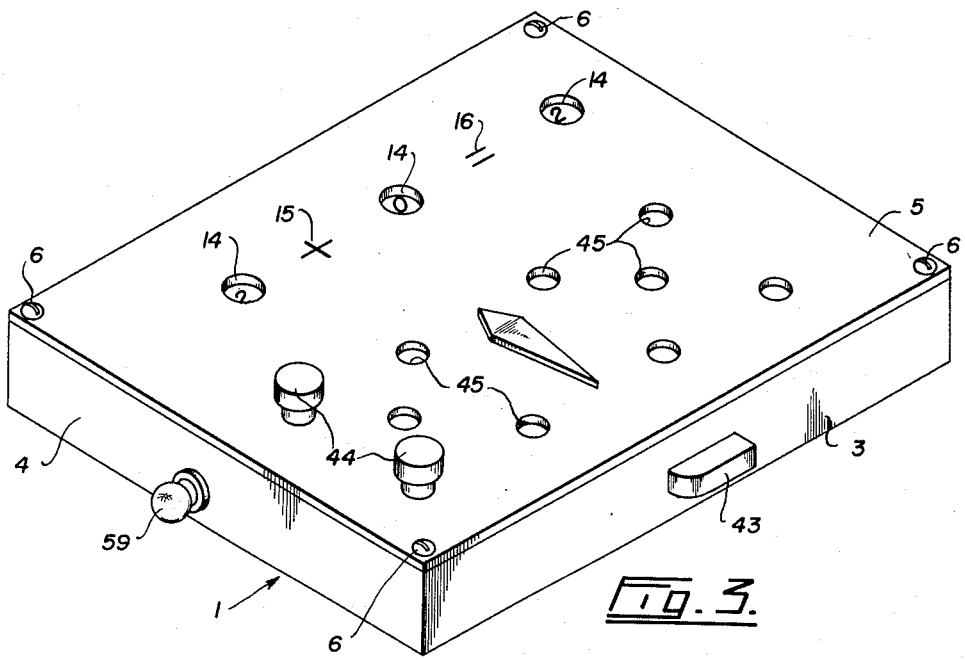
FIGURE 3 is a projected view of my complete device with two pegs inserted.

If a second peg is then inserted in one of the other openings to move another of the slides 22 the wheels 7 and 9 will again be moved so that the integer 2 will be revealed at both places. (See FIGURE 3.)

Figure 4:
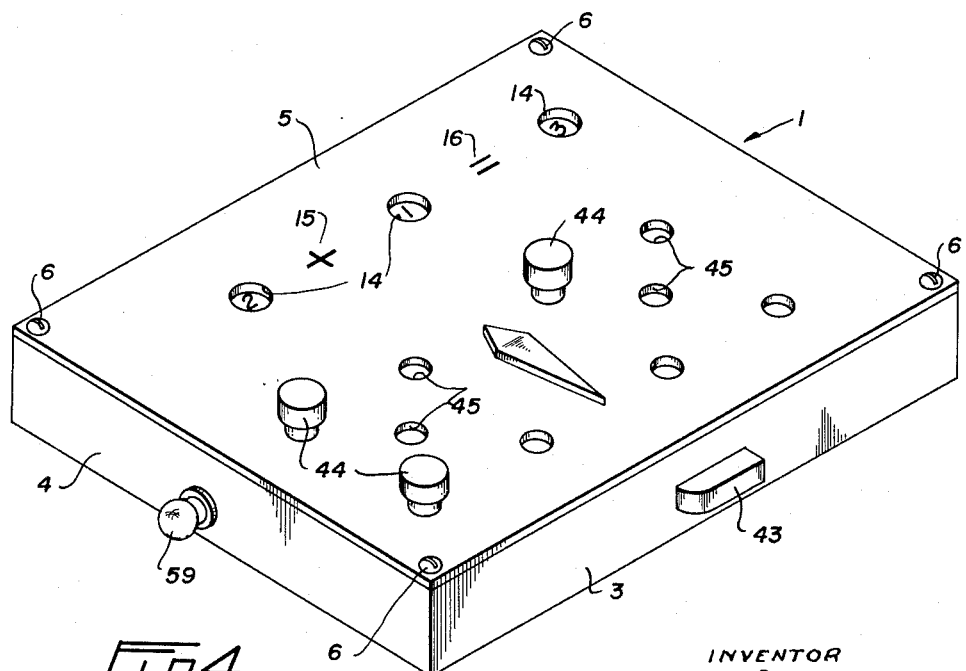
FIGURE 4 is a view similar to FIGURE 3 and with two plus one pegs inserted.

If a peg is then inserted in the openings to move one of the slides 30 the cable 19 will be tightened to move the wheel 8 and reveal the integer 1 through the opening 14 associated with the wheel 8 and at the same time the cable 24 will be tightened to move the travelling block 33 and rotate the wheel 9 to reveal the integer 3 which would in this case be the sum of the two pegs inserted in the holes to move the slides 22 and the one peg inserted in the holes to move the slide 30. (See FIG. 4.)

Movement of the wheels would thereafter take place in accordance with the number of pegs inserted in the openings to always reveal the total number of pegs up to a total of 10 pegs, in the embodiment illustrated.

Obviously an apparatus of this sort would be constructed with any number of holes for any number of pegs desired although I have found the embodiment, illustrated, having two groups of five holes for a total of 10 pegs adequate for the teaching of simple mathematics.

As the pegs are moved from the holes the springs 50, 54 and 57 will obvviously draw on the cables 49, 53 and 55 to move the wheels 7, 8 and 9 in a clockwise direction and the integers revealed in the openings 14 associated with each wheel will always correspond to the number of pegs in the two groups of holes and the total number of pegs in the holes.

While I have illustrated and described a device wherein the addition of numbers is shown automatically, it will be obvious that the peg openings 45 can be extended through the bottom of the housing and suitable openings provided in the bottom of the housing to reveal numbers inscribed on the opposite face of the wheels 7, 8 and 9.

In this case the numerical signs would be changed so that the equal sign would become minus while the plus sign would be equals and the machine then could be used to illustrate problems involving subtraction rather than addition and the results of subtraction of various pegs would be indicated in the appropriate opening.

What I claim as my invention is:

1. A teaching aid comprising a housing having windows therein with mathematical symbols between such windows, a plurality of wheels mounted rotatably in the housing, such wheels each having mathematical integers thereon visible through one of the windows, a plurality of groups of actuating openings in the housing, a plurality of actuating pegs, each insertable in any one of the openings, actuating mechanisms positioned in the housing below each of the actuating openings and coupled operatively to the wheels whereby pegs inserted in the openings will contact the actuating mechanisms and rotate the wheels.

2. The teaching aid as claimed in claim 1 wherein the number of pegs in each of the groups of openings is indicated in a window and the sum of the number of pegs in the openings and the integers revealed by the windows will be indicated in another window.

3. The teaching aid as claimed in claim 1 wherein the actuating mechanism comprises actuating cables wound on the wheels at one end and spring loaded at their opposite ends, slides moveable longitudinally by insertion of a peg in an opening and adapted to tighten the actuating cables and rotate the wheels.

References Cited in the file of this patent

UNITED STATES PATENTS

| 1,536,119 | McDonald | May 4, 1925 |
| 2,527,734 | Isserstedt | Oct. 31, 1950 |

FOREIGN PATENTS

| 481,170 | Canada | Feb. 19, 1952 |